United States Patent
Florencio et al.

(10) Patent No.: US 8,281,147 B2
(45) Date of Patent: Oct. 2, 2012

(54) IMAGE BASED SHARED SECRET PROXY FOR SECURE PASSWORD ENTRY

(75) Inventors: Dinei A. Florencio, Redmond, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

(21) Appl. No.: 11/766,641

(22) Filed: Jun. 21, 2007

(65) Prior Publication Data
US 2008/0320310 A1 Dec. 25, 2008

(51) Int. Cl.
*G06F 21/00* (2006.01)

(52) U.S. Cl. ........ 713/184; 713/153; 713/165; 713/170; 713/171; 713/182; 726/2; 726/18; 726/28; 380/30; 380/56; 380/255; 715/741; 715/742; 715/743

(58) Field of Classification Search .......... 713/156–184; 726/2, 6, 18; 380/30, 56, 255; 715/741–743
See application file for complete search history.

(56) References Cited

U.S. PATENT DOCUMENTS

| | | | |
|---|---|---|---|
| 6,006,328 A | 12/1999 | Drake | |
| 6,981,144 B2 | 12/2005 | Bauman et al. | |
| 7,073,067 B2* | 7/2006 | Mizrah | 713/183 |
| 7,159,120 B2* | 1/2007 | Muratov et al. | 713/182 |
| 7,210,166 B2* | 4/2007 | Davis et al. | 726/6 |
| 7,278,024 B2* | 10/2007 | Sundararajan et al. | 713/183 |
| 7,328,454 B2* | 2/2008 | Strickland et al. | 726/25 |
| 7,345,780 B2* | 3/2008 | Seto | 358/1.15 |
| 7,680,815 B2* | 3/2010 | Komine et al. | 705/67 |
| 7,743,256 B2* | 6/2010 | Yang | 713/182 |
| 7,822,990 B2* | 10/2010 | Varghese et al. | 713/182 |
| 7,836,492 B2* | 11/2010 | Srinivasan et al. | 726/6 |
| 7,941,834 B2* | 5/2011 | Beck et al. | 726/6 |
| 7,961,873 B2* | 6/2011 | Ibrahim | 380/28 |
| 2003/0093699 A1* | 5/2003 | Banning et al. | 713/202 |
| 2004/0059951 A1* | 3/2004 | Pinkas et al. | 713/202 |
| 2004/0128512 A1* | 7/2004 | Sharma et al. | 713/176 |
| 2004/0230843 A1* | 11/2004 | Jansen | 713/202 |
| 2005/0010785 A1* | 1/2005 | Abe et al. | 713/182 |
| 2005/0262557 A1 | 11/2005 | Fellenstein et al. | |
| 2005/0273625 A1 | 12/2005 | Dayan et al. | |

(Continued)

FOREIGN PATENT DOCUMENTS

WO 2006052714 A2 6/2006

OTHER PUBLICATIONS

Ravi Chandra Jammalamadaka, Delegate: A Proxy based Architecture, Dec. 2006, IEEE, vol. ACSAC' 06, pp. 3-8.*

(Continued)

*Primary Examiner* — Nathan Flynn
*Assistant Examiner* — Viral Lakhia
(74) *Attorney, Agent, or Firm* — Lee & Hayes, PLLC

(57) ABSTRACT

The claimed subject matter provides systems and/or methods that facilitate utilizing a shared secret to obscure a password within a sequence of characters. The sequence of characters can include the password as well as noise. The shared secret can leverage utilizing a set of known images that a user can uniquely distinguish from random images. By employing the imaged based shared secret, the user can login to a server from an untrusted machine suspected to be infected with spyware such as a keylogger that tracks user input.

17 Claims, 11 Drawing Sheets

U.S. PATENT DOCUMENTS

| | | | |
|---|---|---|---|
| 2006/0101128 A1 | 5/2006 | Waterson | |
| 2007/0101152 A1* | 5/2007 | Mercredi et al. | 713/185 |
| 2008/0072056 A1* | 3/2008 | Turner | 713/182 |
| 2008/0222417 A1* | 9/2008 | Downes et al. | 713/172 |
| 2008/0250481 A1* | 10/2008 | Beck et al. | 726/6 |

OTHER PUBLICATIONS

Stanford University, "Spyware Resistant Web Authentication Using Virtual Machines," http://crypto.stanford.edu/spyblock/spyblock.pdf, last viewed dec. 28, 2006, 19 pages.

Rusnac. "Securing VPN Using SafeWord PremireAccess," GSEC Certification Paper—Case Study in Information Security, SANS Institute, Oct. 12, 2004, 11 pages.

Ross, et al. "Stronger Password Authentication Using Browser Extensions," 14th USENIX Security Symposium, http://www.usenix.org/events/sec05/tech/full_papers/ross/ross.pdf, last viewed Dec. 28, 2006, 15 pages.

Halderman, et al. "A Convenient Method for Securely Managing Passwords," WWW Conference Committee (IW3C2), May 2005, http://delivery.acm.org/10.1145/1070000/1060815/p471-halderman.pdf?key1=1060815&key2=9728127611&coll=GUIDE&dl=GUIDE&CFID=10002919&CFTOKEN=93254975, last viewed Dec. 28, 2006, pp. 471-479.

Provos, et al. "A Future Adaptable Password Scheme," http://www.usenix.org/publications/library/proceedings/usenix99/provos/provos.ps, last viewed Dec. 28, 2006, 12 pages.

Trevor Pering, et al. Photographic Authentication through Untrusted Terminals. Pervasive Computing, p. 30-36. IEEE CS and IEEE Communications Society. 2003 IEEE.

\* cited by examiner

IMAGE BASED SHARED SECRET PROXY FOR SECURE PASSWORD ENTRY

BACKGROUND

Technological advancements have led to increased ability to access, control, utilize, etc. information from substantially any location. For example, users can receive and read email, perform banking tasks, purchase goods and service, retrieve and update personal records, and so forth from most any geographic location by employing one or more of a variety of devices. Moreover, such devices can be users' personal devices (e.g., personal computers, laptops, personal digital assistants (PDAs), handhelds, gaming devices, cellular phones, . . . ) and/or public devices shared between users such as, for instance, devices available for use in internet cafes, airport lounges, business centers, and the like.

Public devices can be untrusted in the sense that they can be suspected to be infected with spyware that snoops on user activity. Accordingly, use of untrusted machines can present problems in connection with entering sensitive data such as passwords and the like. Employing untrusted machines may be undesirable, yet roaming users oftentimes have little choice but to utilize such machines. Further, these roaming users typically are unable to judge the security status of these machines. Either malice or negligence on the part of an administrator can mean that such machines can be running spyware such as a keylogger, for example. The roaming user has no reliable way of determining whether employing an untrusted device is safe, and has no alternative to typing in a password upon the untrusted device.

In the recent past there has been a surge in various ploys targeting information that can be directly exploited for financial gain, for instance. Keylogging is one of the most insidious threats to a user's personal information. Passwords, credit card numbers, and other sensitive or personally identifying information can be potentially exposed in connection with keylogging. Moreover, keyloggers are becoming more readily available (e.g., writing a keylogger is trivially easy in most major operating systems, there are numerous freeware offerings, . . . ) and many of them make efforts to conceal their presence. For example, keyloggers oftentimes do not appear in a process list.

Enterprise users can most likely trust their desktop systems provided their network administrators maintain good firewall and anti-virus regimes. Knowledgeable home users who keep their systems updated are oftentimes also well protected. However, home users who are less proficient or who leave their system unpatched can be at a greater risk. Further, roaming users who use unfamiliar machines can be subject to an even greater risk since the spyware infection status of public machines is typically regarded as unknown. Safety is based upon both competence and trustworthiness of the administrators managing such unfamiliar machines. As things stand, a roaming user has no reliable way to determine if a machine is running a keylogger or not. In this environment, every session on such a machine can be assumed to be logged. Accordingly, authentication of a user to a login server is oftentimes not secure since sensitive information (e.g., passwords) entered can be logged and thereafter employed by an attacker (e.g., logging in as the user by way of replay of the logged information).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate utilizing a shared secret to obscure a password within a sequence of characters. The sequence of characters can include the password as well as noise. The shared secret can leverage utilizing a set of known images that a user can uniquely distinguish from random images. By employing the imaged based shared secret, the user can login to a server from an untrusted machine suspected to be infected with spyware such as a keylogger that tracks user input.

In accordance with various aspects of the claimed subject matter, a shared-secret proxy can communicate traffic between a client and a login server. The shared-secret proxy can randomly generate a sequence of images that includes both images uniquely identifiable by the user as well as random images. For example, the user can provide a url of a login server and a userid, and this pair can be utilized by the shared-secret proxy to determine the identity of the user (e.g., to retrieve the user images). The randomly generated sequence of images can be provided to the user at an untrusted client to prompt the user as to when to input a legitimate password character (e.g., upon displaying a user image) and when to input a random character (e.g., upon displaying a random image). The string of characters that results can be transferred to the shared-secret proxy, which can unmap the character string to identify the password. Thereafter, the password can be employed along with the url and the corresponding userid to login the user at the login server. Utilization of the shared-secret proxy obscures the password typed by the user, which mitigates replay attacks that can occur when a hacker improperly obtains the password of the user.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
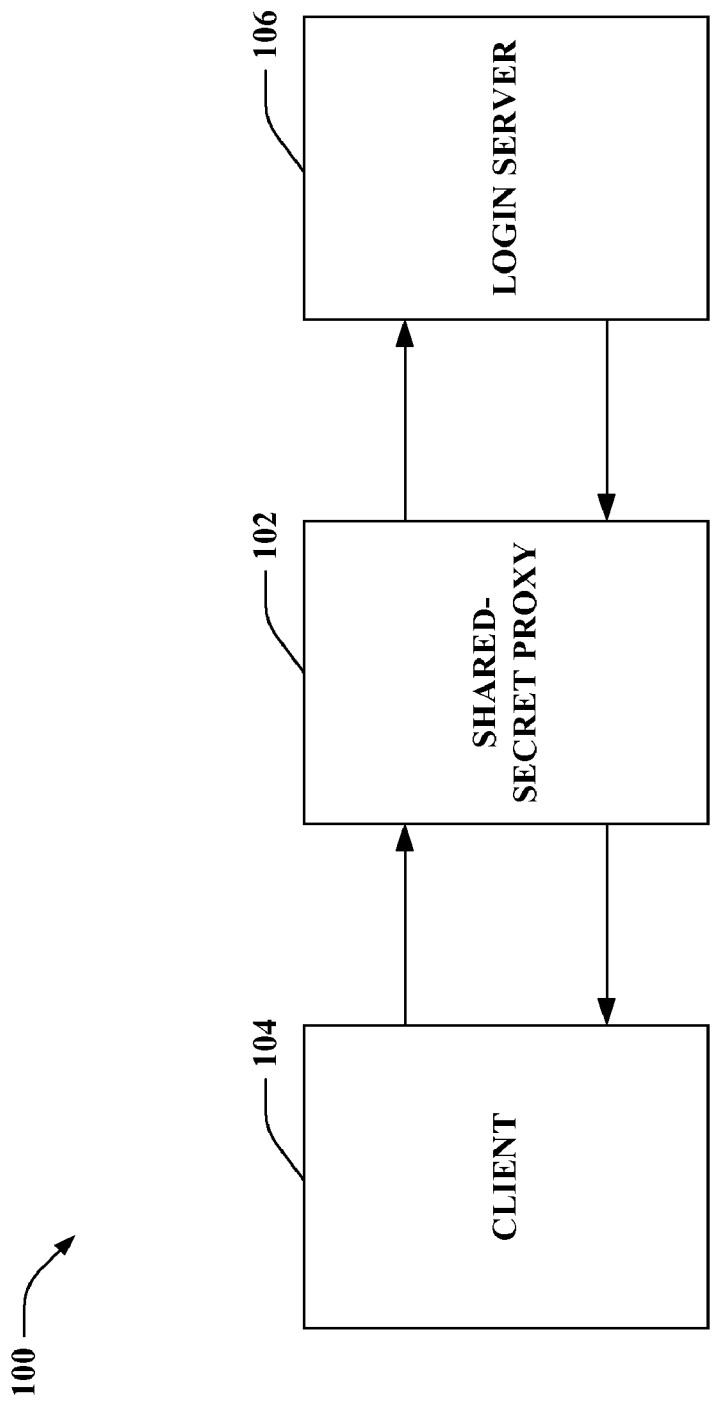
FIG. 1 illustrates a block diagram of an example system that enables obscuring a password entered upon an untrusted device.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that enables obscuring a password entered upon an untrusted device. The system 100 includes a shared secret proxy 102 that communicates traffic between a client 104 and a login server 106. The client 104 can be any type of device such as, for instance, a personal computer, a laptop, a personal digital assistant (PDA), a handheld communication device, a handheld computing device, a gaming device, a cellular phone, a smart phone, and so forth. Moreover, the client 104 can include a browser (not shown) that can be employed by a user. Further, the login server 106 can be any type of server that utilizes a password to authenticate a user, where the user can be employing the client 104 and/or any disparate client (not shown). For instance, the login server 106 can be associated with any sort of account that can be accessed by way of a password provided by the client 104. Moreover, the shared-secret proxy 102 can be a man in the middle (MITM) proxy such that traffic between the client 104 and the login server 106 flows through the shared-secret proxy 102 rather than directly between the client 104 and the login server 106. Also, no changes need to be effectuated to the client 104 (e.g., since a roaming user likely lacks installation privileges, . . . ) and/or the login server 106.

The client 104 can be suspected to be infected with spyware (e.g., a keylogger) that can track user activity, and thus, the client 104 can be untrusted. According to an illustration, the client 104 can be a public machine (e.g., in an internet café, airport lounge, business center, . . . ) that can be utilized by any number of roaming users. A keylogger can capture a user's keystrokes to obtain passwords, encryption keys, etc. entered upon the client 104. Further, on-screen keyboards rendered upon a display of the client 104 and various other alternative login approaches can be susceptible to screenshot recorders that can capture screenshots at each keystroke, mouse click, etc. Although much of the discussion herein focuses on software based keyloggers, it is contemplated that a hardware based keylogger can additionally or alternatively be utilized with the client 104 in a similar manner. For example, hardware keyloggers can be inline devices attached to a keyboard cable, installed within a standard keyboard, built into a keyboard, and the like.

The system 100 can allow data to be entered by a user employing the client 104 assumed to be running a keylogger by embedding a password in random keystrokes to obscure the data from the keylogger. The shared-secret proxy 102 can extract a password from a sequence of keystrokes. By way of example, a user's password can be "snoopy2". The shared-secret proxy 102 can prompt the user to enter legitimate characters (e.g., signal) of the password or random characters (e.g., noise) at particular positions within the user input sequence based upon an agreed upon secret shared between the user and the shared-secret proxy 102. Accordingly, rather than typing the sequence of characters "snoopy2" upon the client 104, random keys can also be typed to make identification of the password by the keylogger more difficult. Thus, instead of capturing the password "snoopy2", the keylogger can obtain, for instance, "laspqm5 nsdgsos8gfsodg4dpuouuyhdg2". The password is now embedded in random keys, which can make extracting it more difficult by the keylogger. However, the shared-secret proxy 102 can differentiate between the legitimate and random characters based upon the prompting sequence that leverages the shared secret. Hence, the shared-secret proxy 102 can extract the actual password from the noise and forward the actual password to the login server 106. Thus, the user can authenticate herself to the login server 106 from the client 104 without allowing an attacker who spies on the login session at the client 104 to login with her credentials at a later time by way of a replay attack.

The system 100 enables a user to type in an obscured password while employing the client 104. The obscured password can be provided by the client 104 to the shared-secret proxy 102, which can unmap the typed keystrokes to yield the actual password. For instance, the actual password can be typed in the clear, but embedded in random keystrokes, and the shared-secret proxy 102 can separate characters of the actual password from the random keystrokes. The shared-secret proxy 102 can also forward the actual password to the login server 106. Thereafter, the shared-secret proxy 102 can revert to a passive role, while remaining in the middle such that traffic between the client 104 and the login server 106 continues to traverse through the shared-secret proxy 102. It is to be noted that the shared-secret proxy 102 does not act as a password management system, and thus, need not store the user's password. Further, the shared-secret proxy 102 need not determine whether the unmapped password provided from the client 104 is correct or incorrect; rather, the shared-secret proxy 102 unobscures the password from the obtained input and forwards the deciphered data to the login server 106. Thus, the login server 106 can accept or deny the login attempt based upon the provided credentials (e.g., userid, password, . . . ).

The shared-secret proxy 102 can prompt the user to enter legitimate password characters or random characters at a particular position within an input sequence. For instance, the shared-secret proxy 102 can enable a sequence of outputs to be rendered by the client 104 (e.g., audio, video, mechanical motion, . . . ). A subset of the outputs can be familiar to the user, while the remaining outputs in the sequence can be unfamiliar. When a familiar output is yielded by the client 104, the user can input the next character of her password, and when an unfamiliar output is provided, the user can input a random character.

By way of example, the rendered outputs utilized to prompt the user can be images with which the user is familiar (e.g., prompt for a character of the password) or is not familiar (e.g., prompt for a random character). At registration time, the user can upload a number of images. For reasonable protection, at least as many images as the length of the longest password she will use (e.g., L images, where L can be substantially any integer) can be provided by the user. The images can be the user's own personal images. The images can be pictures of friends, objects, travel scenes, pets, or any subject matter. Moreover, the images can be taken by the user or obtained elsewhere. It is to be appreciated that the images can depict substantially any subject, be obtained from substantially any source, etc. so long as the user is able to distinguish her images from randomly chosen images. The shared-secret proxy 102 can enable the client 104 to display an image to the user that can be utilized as a prompt. Moreover, a new image can be shown after each keystroke. Further, the images can be chosen randomly from a set of images (e.g., (K+1)L images in the set, where K can be an average number of random images between successive user provided images, which can be substantially any integer, and L is the number of images provided by the user). According to an example, K can be equal to four, and thus, four random images on average can be included in the set of images for every one of the user's images; however, it is to be appreciated that substantially any ratio of user images to random images can be employed. The set of images can include L images from the user and KL random images with which the user has no association. On seeing an image, the user can type, click with a mouse, enter or otherwise input the next character of her password if the image is one of hers, and a random character otherwise.

Assuming that an attacker has no cues to help him determine which images are the users', then there are around $2^{Kp}$ possible passwords. Even if the attacker knows the number of characters in the password, there are still on the order of $(K+1)^p$ possible passwords, where p is the password length.

Moreover, the (K+1)L images in the set should be stripped of any metadata that might allow an attacker to classify which L belong to the user. Further, the same KL random images can be used over and over again as a particular user logs in many times. Also, in a community of a large number of users employing this login technique, each user might be assigned the L images from each of K other users, for instance; however, it is to be appreciated that the claimed subject matter is not so limited.

Figure 2:
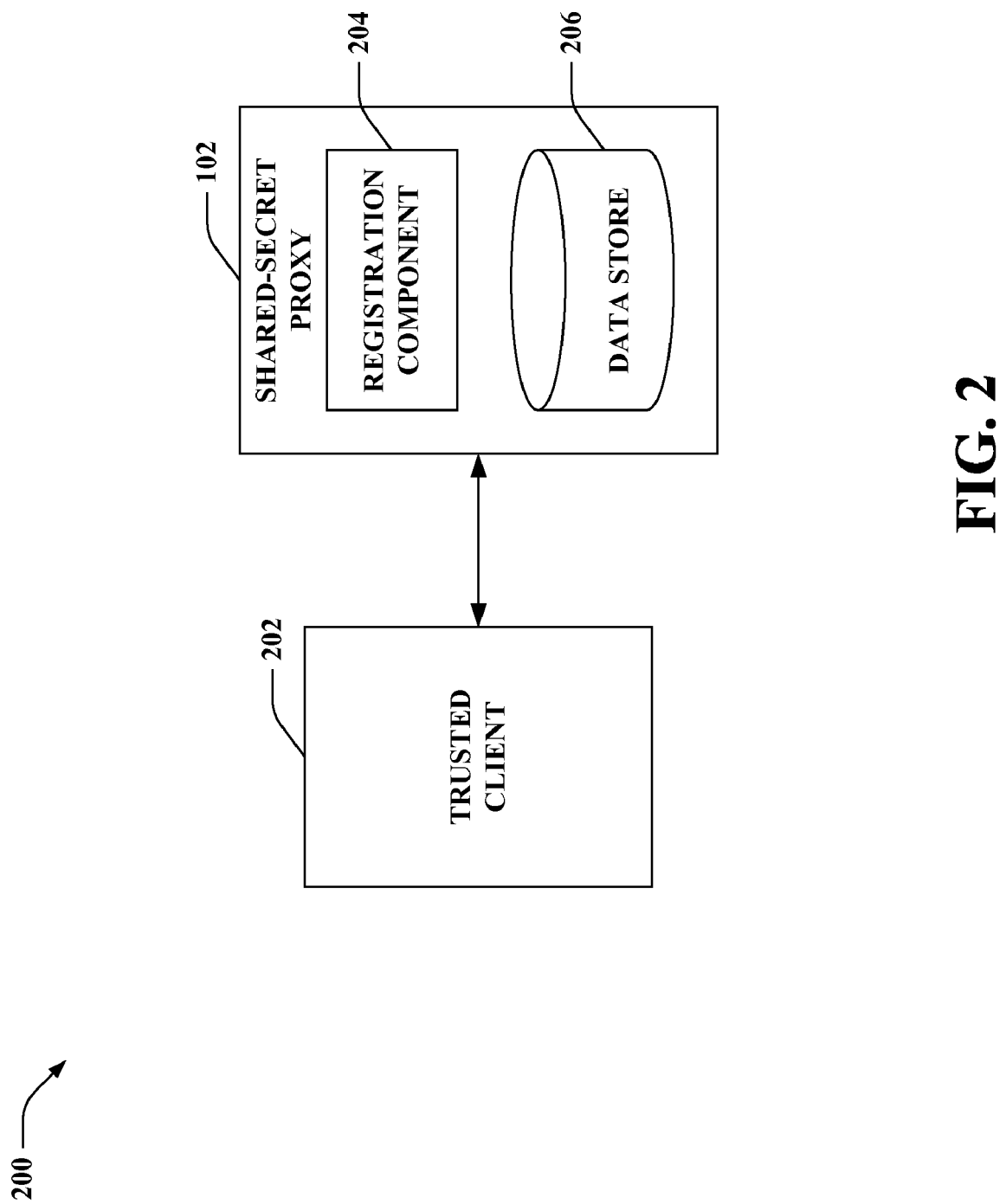
FIG. 2 illustrates a block diagram of an example system that enables initializing a user account upon a shared-secret proxy.

Now referring to FIG. 2, illustrated is a system 200 that enables initializing a user account upon a shared-secret proxy 102. The system 200 can include a trusted client 202 that can communicate with the shared-secret proxy 102 to set up the user account (or any number of user accounts). Further, the shared-secret proxy 102 can include a registration component 204 that prepares the user account upon the shared-secret proxy 102 and a data store 206 that retains information associated with the user account.

A user can employ the trusted client 202 to create the account with the shared-secret proxy 102. By way of illustration, the trusted client 202 can be any device (e.g., a personal computer, a laptop, a personal digital assistant (PDA), a handheld communication device, a handheld computing device, a gaming device, a cellular phone, a smart phone, . . . ) that the user believes is free of spyware such as keyloggers. According to another example, the user can set up the account by employing the shared-secret proxy 102 directly (e.g., if the shared-secret proxy 102 is self-hosted by the user).

To use the service, the user (e.g., employing the trusted client 202) registers with the registration component 204 to establish the shared secret to be used to obscure and unobscure the password. This can be a separate service hosted by a webserver as described in FIG. 5. At registration, the user is assigned a shared secret such as by uploading a set of personal images. The user also specifies the urls of the institutions where she will login, and her userids at each of these institutions. Any of the userid, url pairs uniquely identifies the user. This allows the shared-secret proxy 102 to retrieve the correct shared secret from the data store 206 without having to ask the user to authenticate herself (typing a password to get access to the service would defeat the whole purpose).

The registration component 204 assembles information pertaining to user accounts from the trusted client 202. For instance, the registration component 204 can collect a userid corresponding to each account that may be accessed by employing the shared-secret proxy 102. Further, for each account, a target login domain (e.g., corresponding to the login server 106 of FIG. 1) can be obtained by the registration component 204. These target login domain, userid pairs can thereafter be retained in the data store 206.

The registration component 204 can additionally collect a set of user specific data for each user via the trusted client 202, and the user specific data within the set can be uniquely identified by the user as his or her own. For instance, the user specific data can be a set of images, sounds, mechanical movements, notifications, etc. The user specific data, according to an example, can be a set of images that the user can distinguish as his or her own. According to an illustration, the number of images can be at least equal to the number of characters in the user's longest password; however, it is to be appreciated that any number of images can be included in the set. Moreover, the set of user specific data forms the basis of the secret shared between the user and the shared-secret proxy 102. Further, the set of user specific data obtained from the trusted client 202 can be retained in the data store 206.

The data store 206 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 206 of the subject systems and methods is intended to comprise, without being limited to, these and any other suitable types of memory. In addition, it is to be appreciated that the data store 206 can be a server, a database, a hard drive, and the like.

Typical in-the-cloud password management systems oftentimes have been hosted by large servers and served many users. It contrast, it is contemplated that the shared-secret proxy 102 can be hosted on a machine maintained by the user herself, and dedicated to serving only her, for example. Using this approach, a user who has a fixed IP address on her home machine might host both a proxy and a webserver (as described in connection with FIG. 5) there, and login to the login server (e.g., the login server 106 of FIG. 1) using her home machine as a MITM proxy. This can obviate the need to trust any intermediary, and can remove the single point of attack that a popular centralized webserver might represent. However, the claimed subject matter is not limited to this example.

Figure 3:
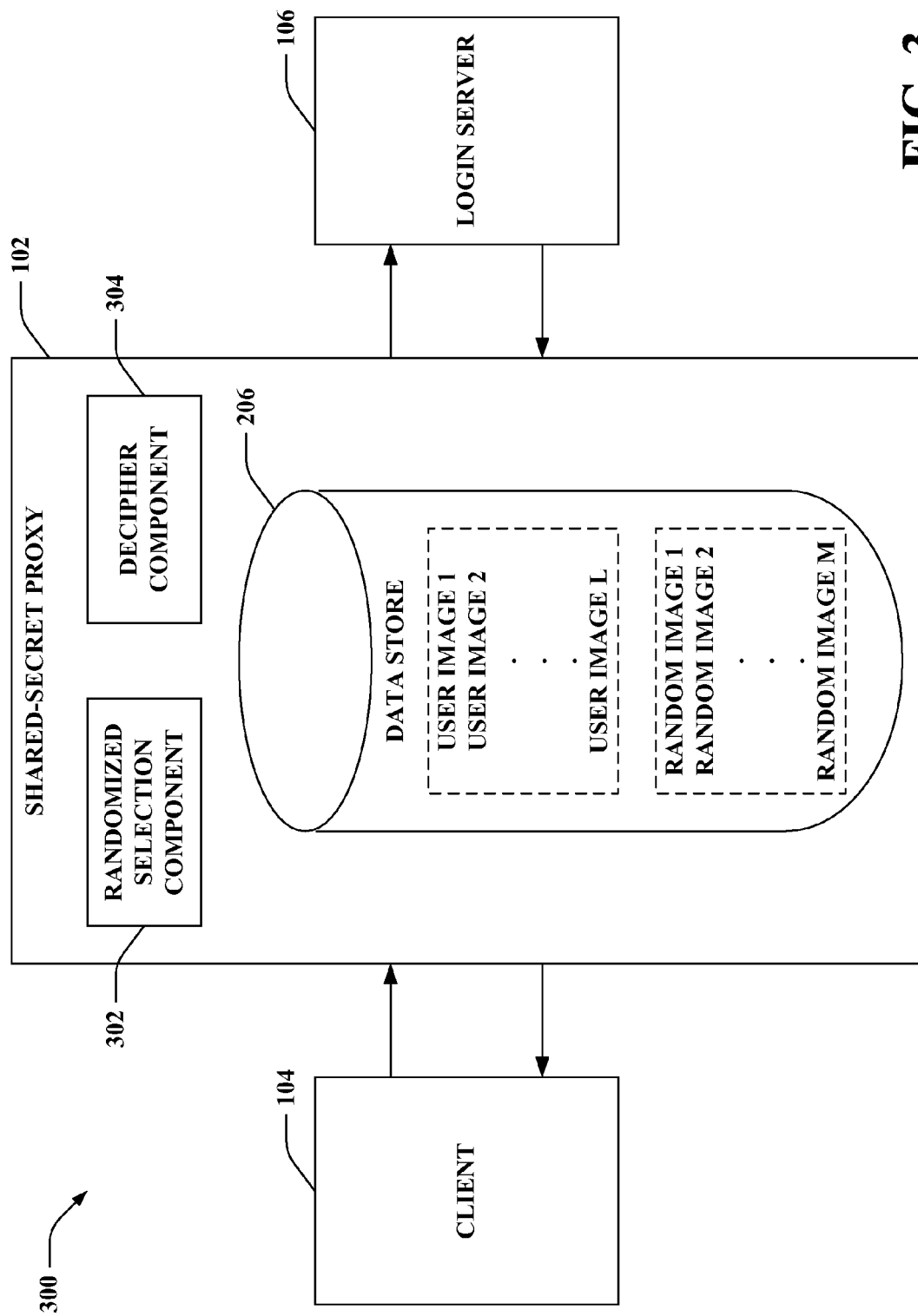
FIG. 3 illustrates a block diagram of an example system that generates user prompts to obscure entry of a password upon an untrusted client.

Turning to FIG. 3, illustrated is a system 300 that generates user prompts to obscure entry of a password upon an untrusted client. The system 300 includes the shared-secret proxy 102 that passes data between the client 104 and the login server 106. The shared-secret proxy 102 further includes a randomized selection component 302, a decipher component 304, and the data store 206.

A user can employ the client 104 to communicate with the login server 106 via the shared-secret proxy 102. The user can send a userid and url of a domain associated with the login server 106 to the shared-secret proxy 102. Based upon the userid, url pair, the shared-secret proxy 102 can identify the user (e.g., from data stored in the data store 206) as well as images retained in the data store 206 pertaining to the identified user (e.g., user image 1, user image 2, . . . user image L, where L can be substantially any integer) and a set of random images (e.g., random image 1, random image 2, . . . random image M, where M can be substantially any integer).

The randomized selection component 302 can order user images and random images from the data store 206 in any sequence. For example, approximately K random images on average can be placed between consecutive user images, where K can be substantially any integer; however, it is to be appreciated that more or less than K random images can be positioned between two particular user images in the sequence. Moreover, it is contemplated that two particular user images can be adjacent each other in the sequence yielded by the randomized selection component 302 without a random image there between; however, the claimed subject matter is not so limited. According to an example, 10 user images and 40 random images can be associated with a user, and the randomized selection component 302 can generate any random sequence of the 50 images for each login attempt.

The randomized selection component 302 (and/or the shared-secret proxy 102) can transmit the entire sequence of images to the client 104 along with the ordering. Thereafter, the client 104 can present the images to the user one at a time such that the displayed image changes to the next in the sequence of images upon each input by the user. When a user image is rendered, the user can input a next character of his or her password and when a random image is displayed, the user can input a random character. The client 104 can collect the sequence of input characters from the user in response to the image sequence and transmit the sequence of input characters back to the shared-secret proxy 102. For example, the sequence of input characters can be transferred from the client 104 when the user selects a submit button. The user can select to submit the sequence of input characters after inputting the last character of his or her password, when a next user image is displayed subsequent to entering a last character of his or her password, at any random time after his or her complete password has been entered, etc.

The decipher component 304 can employ the sequence of images generated by the randomized selection component 302 to distinguish password characters from random noise characters in the sequence of input characters to yield the unmapped password. The shared-secret proxy 102 (and/or the decipher component 304) can then forward the unmapped password to the login server 106 (e.g., along with the userid). Further, the decipher component 304 can enable temporarily storing the unmapped password in the data store 206. For example, the unmapped password can be retained with a corresponding time stamp, and thus, if the login session does not succeed after a predetermined amount of time, the unmapped password can be deleted from the data store 206. Additionally, it is to be appreciated that the shared-secret proxy 102 can transmit each image in the sequence to the client 104 one at a time and/or receive the input sequence from the client 104 one character at a time.

Figure 4:
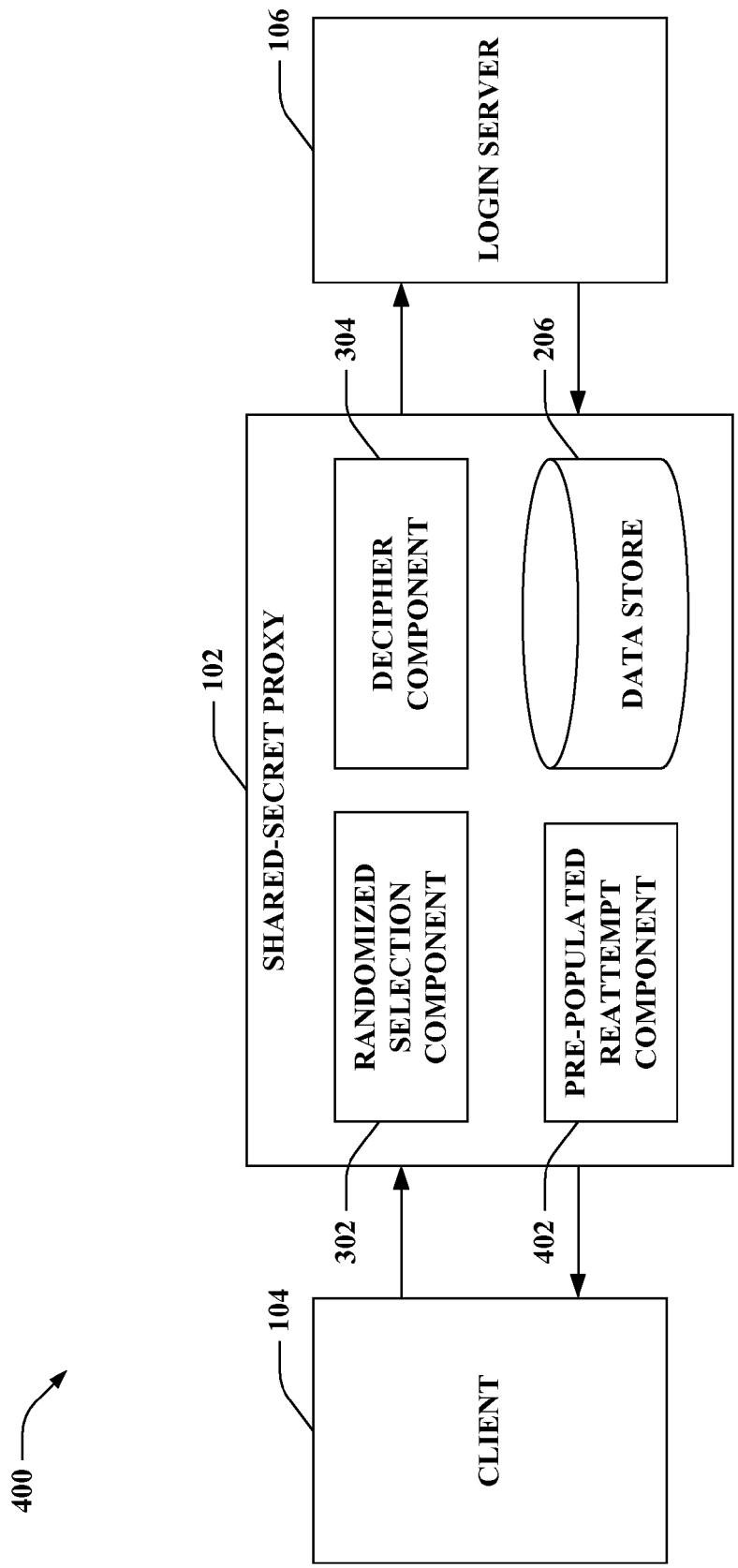
FIG. 4 illustrates a block diagram of an example system that enables retrying password entry while mitigating an effect of an averaging attack.

Now referring to FIG. 4, illustrated is a system 400 that enables retrying password entry while mitigating an effect of an averaging attack. The system 400 includes the shared-secret proxy 102 that communicates with the client 104 and the login server 106. The shared-secret proxy 102 can further include the randomized selection component 302, the decipher component 304, and the data store 206. Further, the shared-secret proxy 102 can include a pre-populated reattempt component 402 that allows similar noise to be provided when reentering a password upon the client 104.

The pre-populated reattempt component 402 handles a situation where an attempt to login to the login server 106 fails. Failure can occur by accident or design (e.g., an attacker blocking a network connection to prevent the login from succeeding, . . . ). The pre-populated reattempt component 402 enables the shared-secret proxy 102 to send back the sequence of input characters previously provided to the client 104 as well as the corresponding sequence of images. Thus, instead of having to reenter input characters into blanks, the input characters corresponding to the images can be pre-populated. Moreover, the user can scroll through the image/input character pairs and alter one or more of the input characters. Thus, if the user mistakenly inputted one character of her password (e.g., "snoopx2" rather than "snoopy2", . . . ), the user can adjust that one mistyped character (e.g., replace "x" with "y", . . . ). Additionally, the user can choose to alter some of the randomly entered noise characters to attempt to confuse an attacker (e.g., else, if only one character in the input character sequence is changed and login is successful, that one character is clearly a character in the user's password). Moreover, the pre-populated reattempt component 402 can block login retries after a predetermined number of failures and/or if more than a threshold number of characters are changed in the sequence of input characters.

The pre-populated reattempt component 402 mitigates averaging attacks. When trying to extract signal from noise, multiple independent measurements can help reduce the noise. For example, the user's password can be "snoopy2", which can be embedded in the string: "laspqm5 nsdgsos8gfsodg4dpuouuyhdg2". If a login attempt fails and the user was to randomly generate noise a second time while trying again to login to the login server 106, the string might be: "wqsasdfnk4olou3dnsodgsjap1yheyjedrd2". As more embedded strings are gathered, the password keys are the only thing constant as everything else in the string can change. A simple dynamic programming approach can reveal the password if it has access to even two of the embedded strings. For this reason, spyware has a far simpler task if the first login attempt is unsuccessful and the user types it a second time. Equally, if a user realizes that she typed a random key instead of a password key and backspaces to correct it, she generally gives away one key of the password. Hence, the pre-populated reattempt component 402 can mitigate the foregoing.

Figure 5:
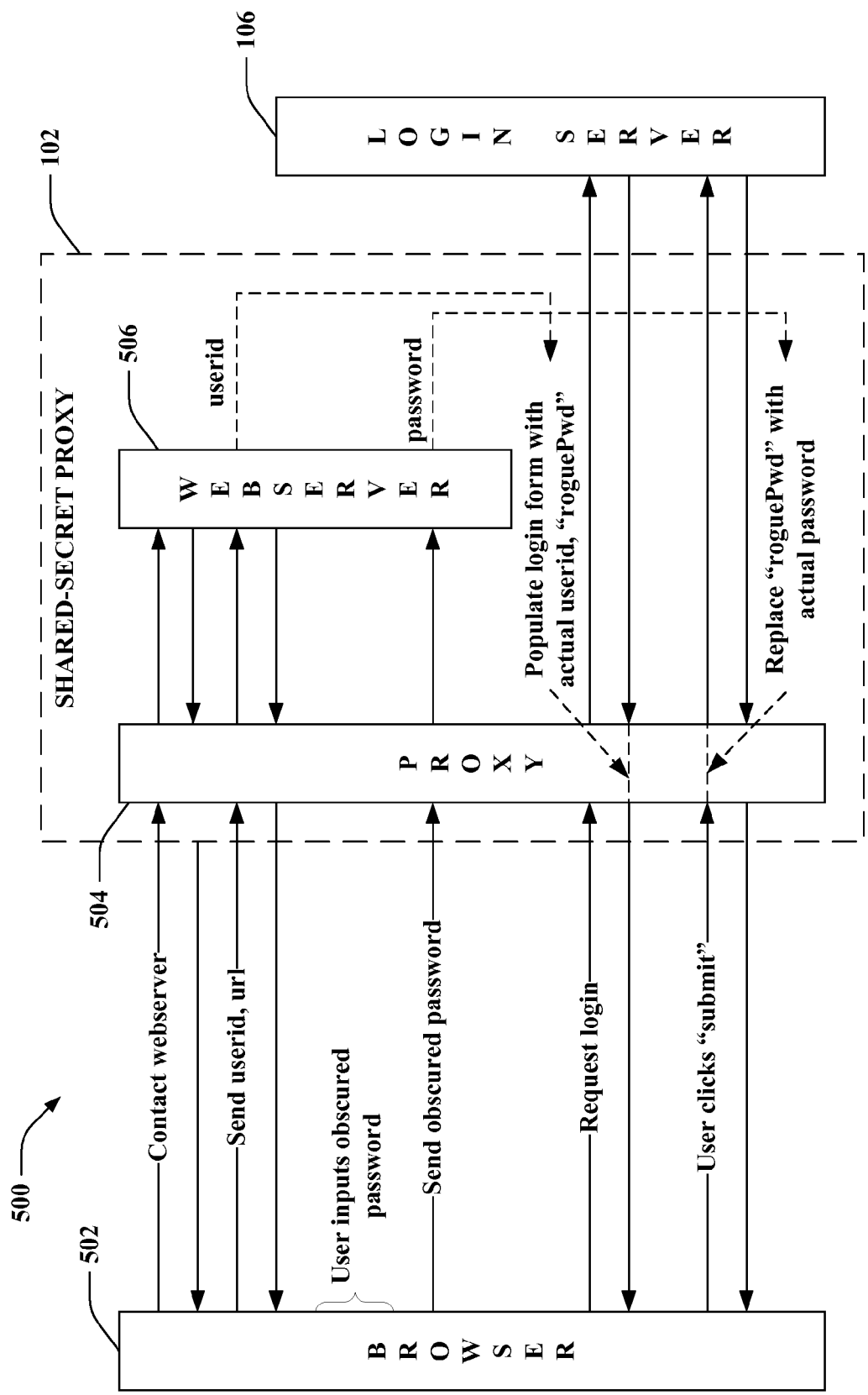
FIG. 5 illustrates a block diagram of an example system that employs a login sequence with a shared-secret proxy.

Turning to FIG. 5, illustrated is a system 500 that employs a login sequence with a shared-secret proxy 102. The system 500 can include the shared secret proxy 102, a browser 502 (e.g., associated with an untrusted client such as the client 104 of FIG. 1), and the login server 106. Moreover, the shared-secret proxy 102 can further include a proxy 504 and a webserver 506 as described below. According to an illustration, Javascript scripts can run in the user's browser 502. ASP.Net scripting can be employed to handle the actions to be performed at the webserver 506, for example. Moreover, JScript scripting can be used in the proxy 504 to alter certain requests and responses between the client browser 502 and the login server 106.

The following provides an example sequence of events associated with the system 500. It is to be appreciated that the following is provided as an illustration, and that the claimed subject matter is not so limited. For instance, the events can occur in a differing order, events need not occur and/or additional events can occur. Pursuant to this example sequence, the user can set the browser 502 to point at the proxy 504. Then, the user can navigate to the webserver 506, enter the userid and url and receive shared secret prompts. Next, the user can enter an obscured password using prompts based on the sequence of images (e.g., user images and random images) and submit the obscured password to the webserver 506. Thereafter, the webserver 506 can extract the password from the obscured password. Next, the browser 502 is auto-transferred to request the url. The proxy 504 can then intercept the response and populate a login form with the userid and "roguepwd" in the password field. Thus, the user receives a pre-populated actualLogin page and clicks a submit button. Next, the proxy 504 intercepts the request and replaces "roguepwd" with the extracted password XOR salt from the database. Moreover, the proxy 504 can delete the entire record (userid, pwd XOR salt, actual—Login) from the database. Thereafter, login proceeds and the proxy 504 reverts to a MITM role.

To use the service, a user first points the browser 502 at the proxy server 504. By entering the IP address of the proxy 504, connections from the browser 502 to the login server 106 flow through the proxy 504. Note that this does not require installation or privileges that are not available to all users. For example, a user at an internet cafe can effectuate this task.

The user next navigates to the webserver 506 and enters the obscured password by leveraging the image based shared secret. When the obscured password has been uploaded to the webserver 506, the user's browser automatically opens a login page (e.g., www.bigbank.com/login). The user need type nothing further and merely clicks the submit button and login proceeds.

The webserver 506 can act as the visible component. The user can be asked for the address actualLogin of the login site, and her userid at that site. At this point, the webserver 506 retrieves the shared secret for that user. The user can enter the obscured password using the aforementioned shared secret technique. For example, the images can be downloaded to the browser 502 at once to avoid the possible delay of a roundtrip to the server at each keystroke. The images are labeled in the order in which they will be displayed, and thus, reveal nothing of the shared secret. Using the onkeydown event handler, a new image can be displayed every time the user types a key (e.g., or provides input by any other manner). No further action is needed until the user submits.

When the user clicks a "Submit" button, the entire obscured password string can be uploaded to the webserver 506. This string can be the password embedded in junk characters. The webserver 506 extracts the true password from the obscured string and can store it temporarily for retrieval by the proxy 504. The password can be XORed with a user-specific salt assigned at registration time. Next, the webserver 506 can instruct the user's browser 502 to open actualLogin using the onclick event for the "Submit" button utilizing, for example, the Javascript command http://www.bigbank.com/login.

The connections for the browser 502 can pass through the proxy 504. The proxy 504 can intercept all sessions, including those that are SSL encrypted. Additionally, the proxy 504 can provide a Jscript scripting mechanism that allows filtering and altering requests and responses.

Observe from FIG. 5 that, while it sits as a MITM for the actions of the browser 502, it is only after the obscured password has been uploaded to the webserver 506 that the proxy 504 starts to play an active role. When the user retrieves the page actualLogin (e.g., http://www.bigbank.com/login), the request and response both flow through the proxy 504. It is contemplated that actualLogin is the target login page, and thus, includes both a userid and password form field. At this point, the proxy 504 scripts populate these fields before passing them to the browser 504. The userid is populated with the actual userid that has been deposited in a database (e.g., retained in the data store 206 of FIG. 2), while the password field is populated with the string "roguepwd." To replace the password, the proxy 504 can search for and replace the string type="password" with type="password" value="roguepwd". This can be done in the on BeforeReponse handler; this handler allows editing responses coming back from the login server 106 before they are passed to the browser 502. To replace the userid value, a similar technique can be employed. However, the userid is merely a text field, and there may be several on the page, so the string type="text" is not sufficient to indicate that the appropriate field has been found. The userid field has an id that can be different for different sites; for example, at PayPal it is id="login email" and at Wells-Fargo it is id="SSN". Rather than manually determine the string for each possible login site, a cumulative list of the id of the userid fields for all of the login sites encountered can be maintained. It is to be noted that the number of distinct labels is far fewer than the number of sites (e.g., the id "SSN" is common). If any of these labels are found, the proxy 504 can replace, for example, id="login email" with id="login email" value="userid", where userid is the actual userid retrieved from the database. If this fails, and the userid field has a label not previously encountered, the userid can be entered as the value for every text field on the page. This will have the effect of populating every text field, including Search and any others present with the userid. Since only the login form will be submitted, these extra entries in other form fields will be ignored when the user submits the login form. Note that by populating the login form fields in the HTML response from the login server 106, difficulties associated with the Javascript same-origin policy can be mitigated.

Thus, when actualLogin opens on the user's machine it is pre-populated with the correct userid, but a rogue value password. The actual password is not included in the page returned to the user, as this would deliver the unobscured password to the untrusted client. The reason for the rogue value password is that many login pages perform scripting checks to prevent submission of the form if the password field is empty. The user now clicks the submit button on actualLogin. This request again flows through the proxy 504, and the proxy 504 replaces the rogue value password with the password retrieved from the database (XORed once again with the user specific salt). This can be effectuated in the on BeforeRequest handler, which allows editing of requests as they are passed from browser 502 to server 106. From this point on the proxy 504 merely acts as a MITM between the user's browser 502 and the end site. For instance, the proxy 504 can maintain an SSL connection to the user and another to the end site.

A difference between the system 500 and an in-the-cloud password management system is that the passwords do not have to be maintained on the by the shared-secret proxy 102, which can provide a number of advantages. For instance, the burden of maintenance on the user is lower. Using a credential management system (CMS), the user must maintain all of the credentials; if she changes her PayPal password, she must then also update the record at the CMS, for instance. The user of the system 500 by contrast is not required to maintain anything. She registers for the service once, and is assigned a shared secret. She can upload her images once when employing the image based interface. She need maintain nothing, and can still use the service after a gap of months or years so long as she can successfully distinguish her images from the randomly assigned images.

Moreover, a CMS typically must be trusted much more than the system 500. A rogue employee at a CMS might have access to all of the credentials of all of the users of the CMS system. A rogue employee at a service running the system 500 by contrast would have to wait for passwords as they come in one at a time. The user of a CMS trusts the service entirely with all of the credentials she uploads. This is true whether she subsequently uses the service or not. Meanwhile, the user of the system 500 trusts the system 500 with only the passwords of sites that she logs into, and she does this only when the alternative is trusting an untrusted client (e.g., internet kiosk in a café, airport business center, . . . ).

Figure 6:
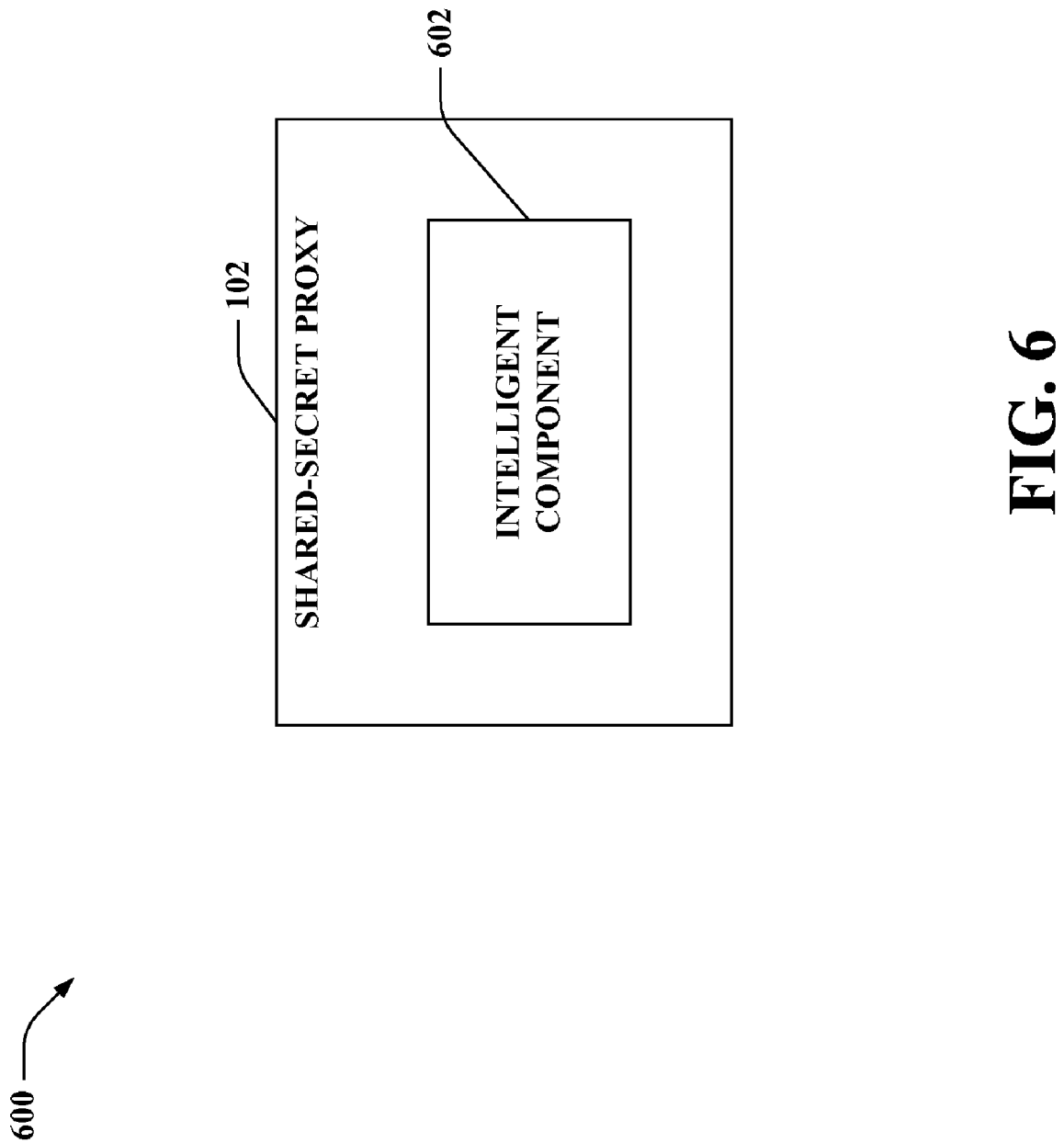
FIG. 6 illustrates a block diagram of an example system that yields inferences in connection with utilizing an image based shared secret for masking password data inputted by a user employing an untrusted device.

Turning to FIG. 6, illustrated is a system 600 that yields inferences in connection with utilizing an image based shared secret for masking password data inputted by a user employing an untrusted device. The system 600 can include the shared-secret proxy 102 that can be substantially similar to the aforementioned description. The shared-secret proxy 102 can further include an intelligent component 602. The intelligent component 602 can be utilized by the shared-secret proxy 102 to reason about whether an attempt to login is being effectuated by a hacker. For example, the intelligent component 602 can infer whether a login attempt after a successful login attempt is a replay attack by a hacker (e.g., if the same sequence of input characters is provided from a client such that it appears to disregard the challenge-response nature of the prompting provided by the shared-secret proxy 102, . . . ). Moreover, the intelligent component 602 can infer whether to decline to forward an unmapped password, delete an unmapped password from temporary memory (e.g., age out the password, . . . ), re-challenge a user based on the shared secret, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
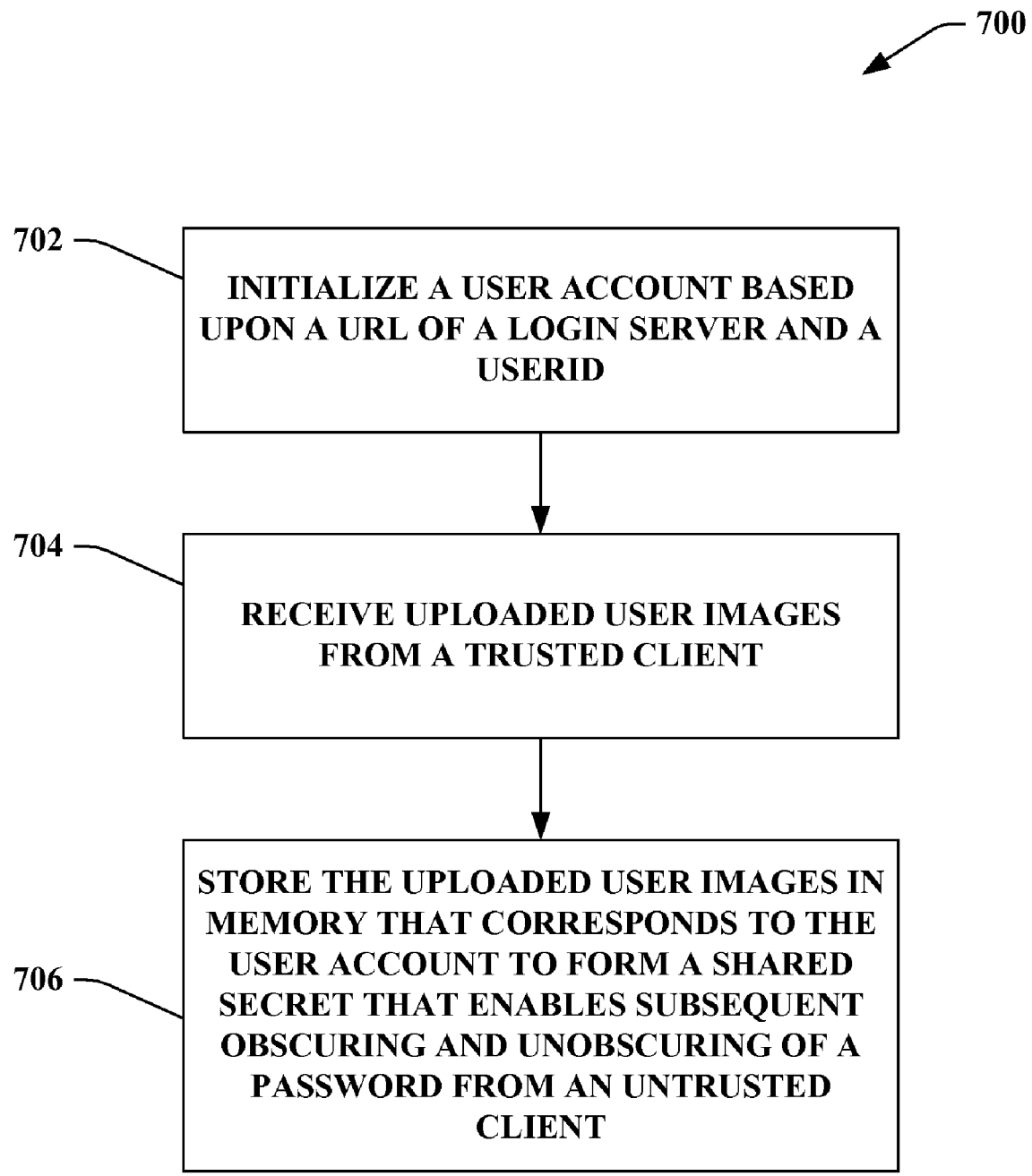
FIG. 7 illustrates an example methodology that facilitates setting up a user account with a shared-secret proxy.
Figure 8:
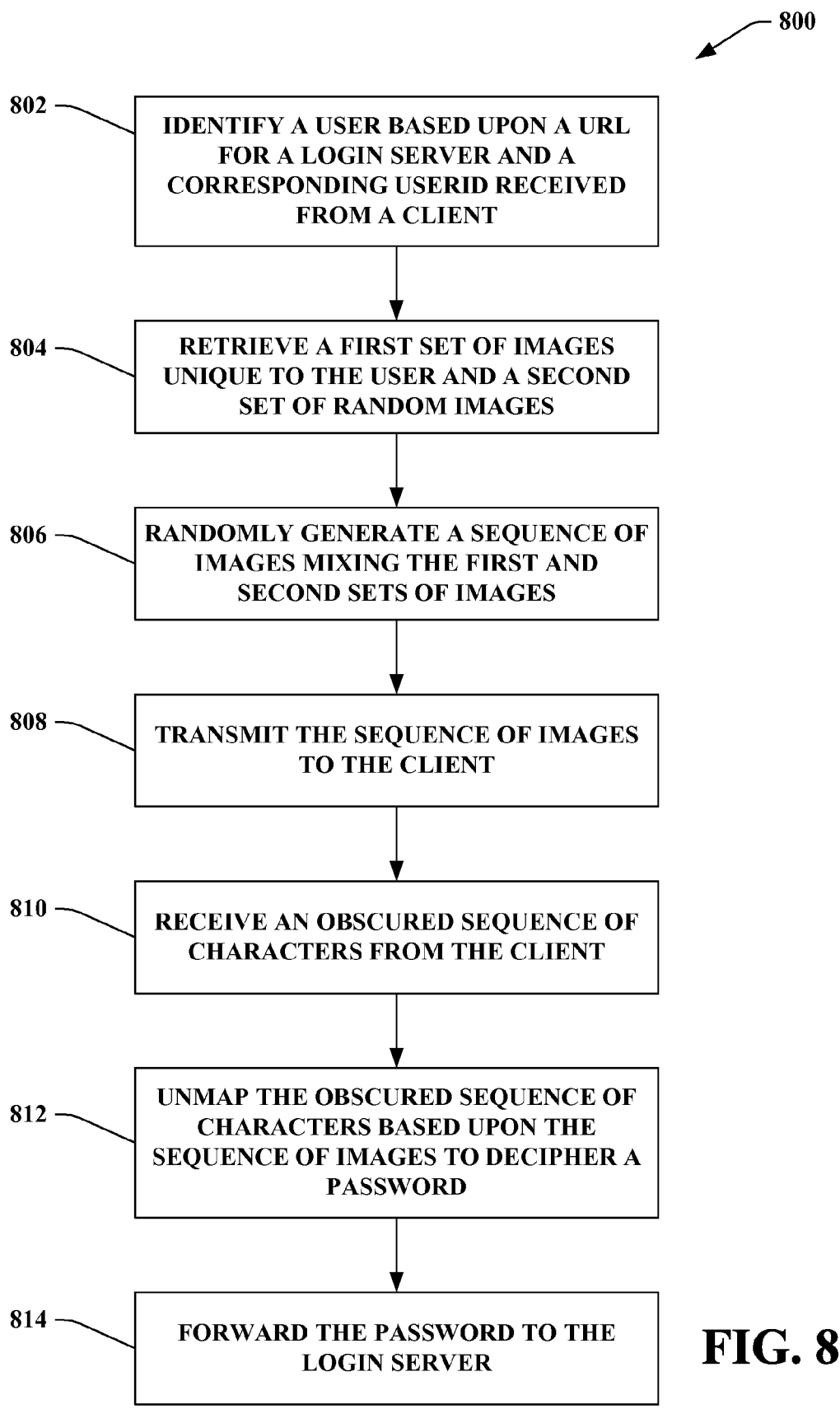
FIG. 8 illustrates an example methodology that facilitates logging in a user from an untrusted client via a shared-secret proxy.
Figure 9:
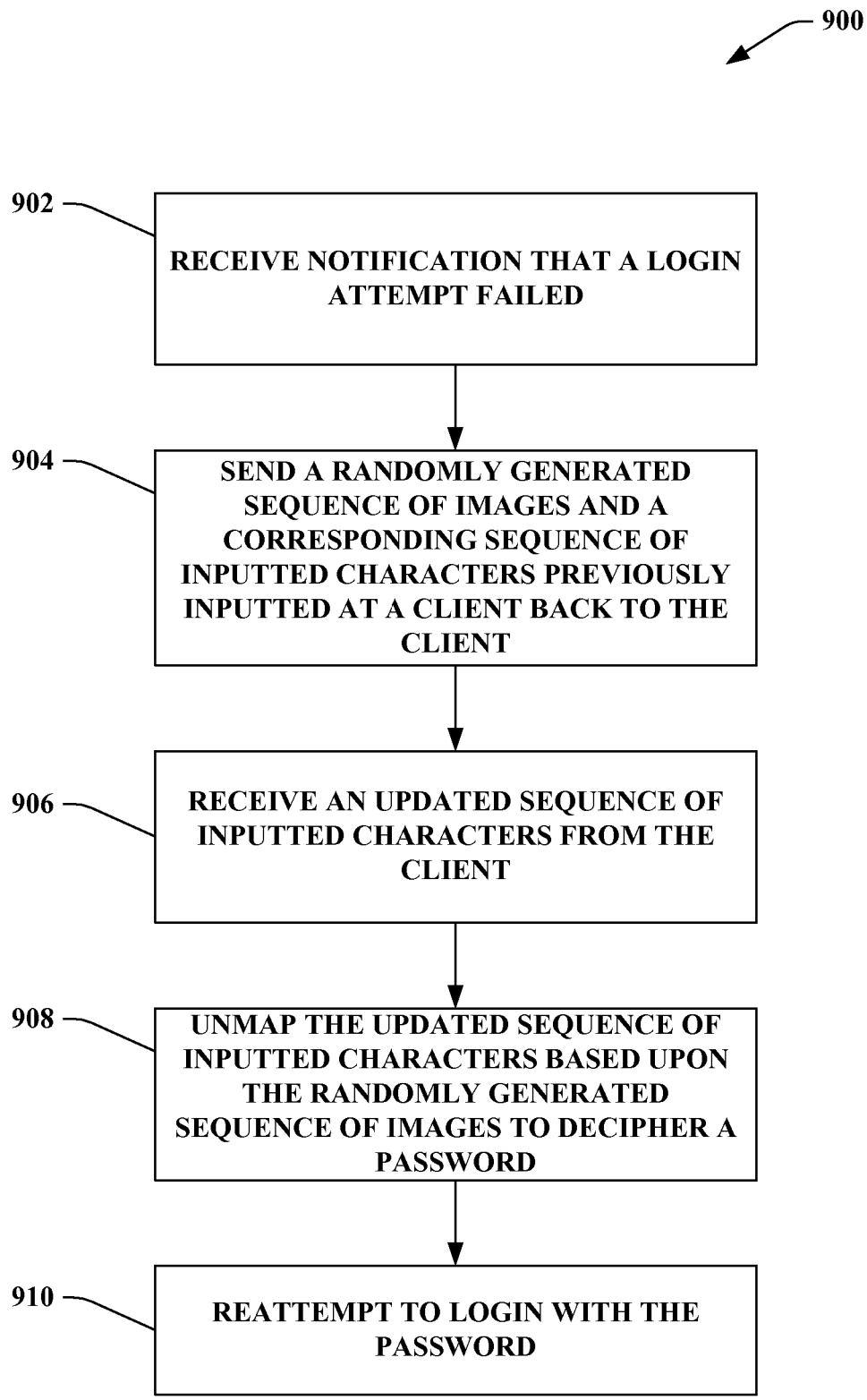
FIG. 9 illustrates an example methodology that facilitates reattempting to login after a previous login failure.

FIGS. 7-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 7, illustrated is a methodology 700 that facilitates setting up a user account with a shared-secret proxy. At 702, a user account can be initialized based upon a url of a login server and a userid. For instance, such information can be obtained from a trusted client. According to another example (e.g., where the shared-secret proxy is self-hosted), the information can be directly inputted to the shared-secret proxy. The url, userid pair can be employed to uniquely identify the user. Moreover, any number of url, userid pairs for a particular user can be obtained. At 704, user images uploaded from a trusted client can be received. The images can be any images that the user can distinguish from random images; however, it is to be appreciated that an attacker should not be able to decipher such user images from the random images. At 706, the uploaded user images can be stored in memory that corresponds to the user account. The user images, thus, can form a shared secret that enables subsequent obscuring and unobscuring of a password (e.g., intended for use in connection with the login server) from an untrusted client.

Now referring to FIG. 8, illustrates is a methodology 800 that facilitates logging in a user from an untrusted client via a shared-secret proxy. At 802, a user can be identified based upon a url for a login server and a corresponding userid received from a client. At 804, a first set of images unique to the user and a second set of random images can be retrieved. For instance, these sets of images can be obtained from memory based upon the user identification. It is contemplated that the first set of images can include L images, where L can be substantially any integer. Moreover, the second set of images can include K×L images, where K can be substantially any integer. According to an example, L can be 10 and K can be 4; however, it is to be appreciated that the claimed subject matter is not so limited. At 806, a sequence of images that mixes the first and second sets of images can be randomly generated. By randomly creating the sequence of images, a user can be prompted to enter a password embedded in random characters such that a hacker is unable to discern password characters from the random characters, yet the shared-secret proxy can remove the random characters.

At 808, the sequence of images can be transmitted to the client. At 810, an obscured sequence of characters can be received from the client. At 812, the obscured sequence of characters can be unmapped based upon the sequence of images to decipher a password. For example, the order of the user images and random images can be evaluated such that any character corresponding to a user image in the sequence of images is identified as a password character and any character corresponding to a random image is determined to be noise and thus discarded. At 814, the password can be forwarded to the login server.

With reference to FIG. 9, illustrated is a methodology 900 that facilitates reattempting to login after a previous login failure. At 902, a notification that a login attempt failed can be received. For instance, the notification can be obtained from a login server. At 904, a randomly generated sequence of images and a corresponding sequence of inputted characters previously inputted at a client can be sent back to the client. By returning the sequence of inputted characters to the client, the random characters (e.g., noise) previously provided by the user can be reused to mitigate an effect of an averaging attack. At 906, an updated sequence of inputted characters can be received from the client. For example, a subset of the characters in the previously inputted sequence can be updated as opposed to changing the entire sequence. At 908, the updated sequence of inputted characters can be unmapped based upon the randomly generated sequence of images to decipher the password. At 910, a login can be reattempted with the password. It is contemplated that if the login fails a predetermined number of times, subsequent login attempts can be blocked, for example.

Figure 10:
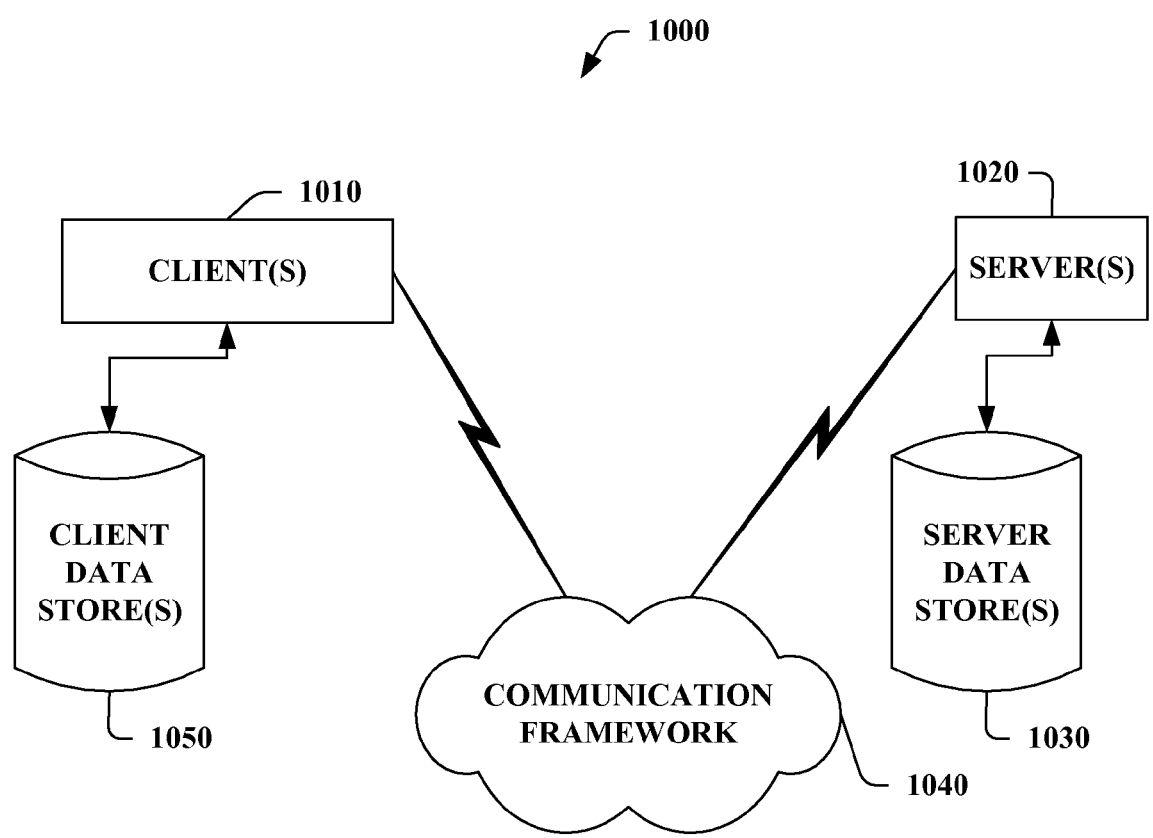
FIG. 10 illustrates an example networking environment, wherein the novel aspects of the claimed subject matter can be employed.
Figure 11:
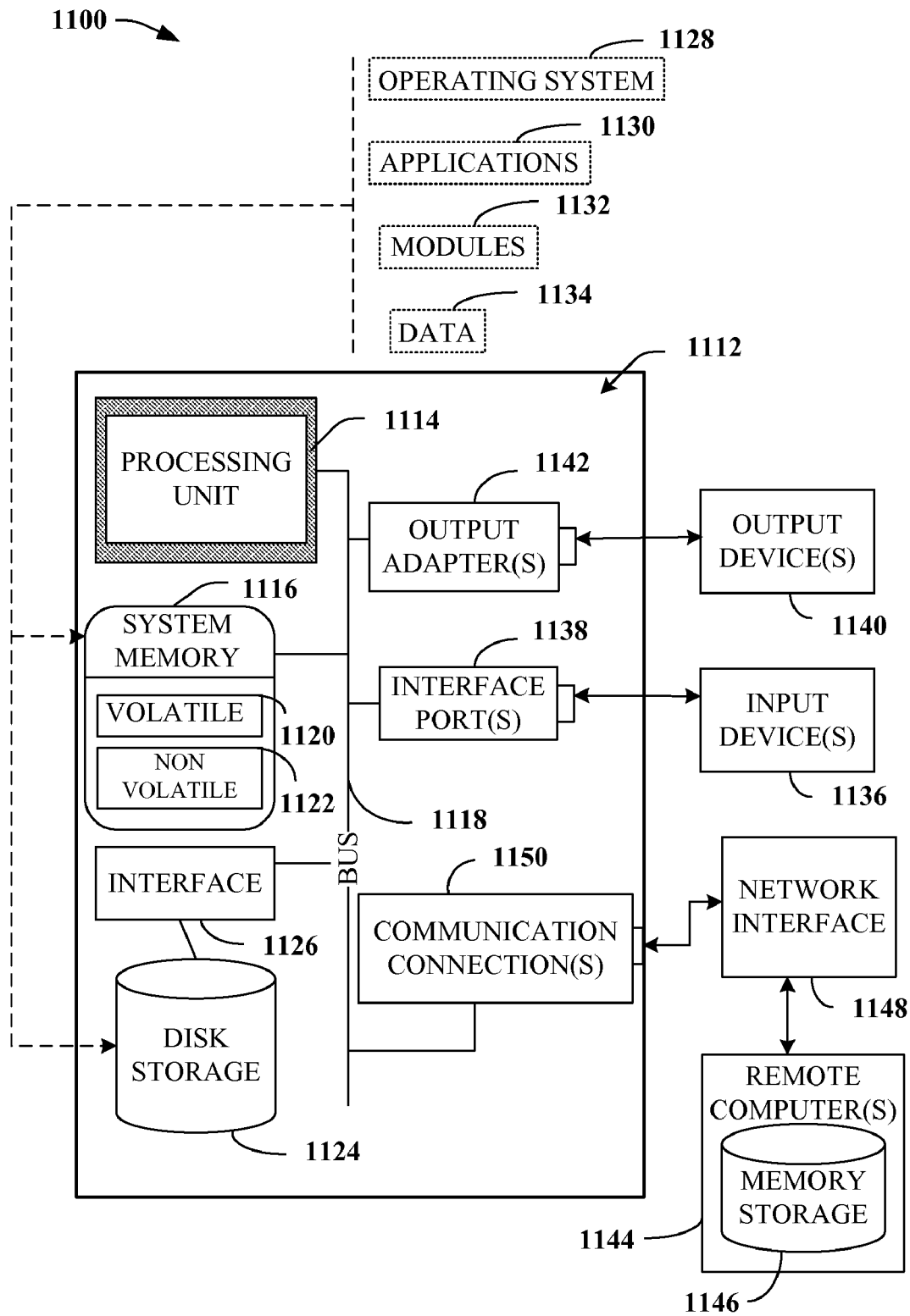
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with generating text data and/or outputting such data for closed captions associated with a real time conference. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that enables obscuring a password entered upon an untrusted client, comprising:
    a data store that includes a set of user images that are selected by a user;
    a randomized selection component that generates a sequence of images; and
    a shared-secret proxy residing on the untrusted client or a web server that communicates traffic between the untrusted client and a login server, the shared-secret proxy to:
    receive a request for a login to the login server from the untrusted client;
    provide the sequence of images to the untrusted client, the sequence of images including a plurality of images from the set of user images intermixed with one or more random images, each of the plurality of images prompting the user to sequentially enter a password character that is unduplicated in the plurality of images, and each random image prompting the user to enter a random character that is unrelated to a password that includes password characters; and
    receive a character string from the untrusted client for logging into the login server that includes password characters of the password obscured by at least one random character,
    wherein the shared-secret proxy further comprises a registration component that prepares a user account including a uniform resource locator (URL) and a user identifier pair that uniquely identifies the set of user images, the shared-secret proxy automatically retrieves the set of user images for integration into the sequence of images in response to an initiation of the login to the login server with a submission of the URL and the user identifier pair to the shared-secret proxy.

2. The system of claim 1, wherein the data store deletes a password yielded from the character string after a predetermined amount of time.

3. The system of claim 1, wherein the shared-secret proxy further comprises a decipher component that distinguishes password characters from random characters in the character string based upon the sequence of images to determine the password.

4. The system of claim 3, wherein the shared-secret proxy forwards the password to the login server.

5. The system of claim 3, wherein the shared-secret proxy further comprises a pre-populated reattempt component that enables sending back the character string and the sequence of images to the client to prompt the user to update a subset of the characters in the character string to reattempt logging in to the login server upon login failure.

6. The system of claim 1, wherein the shared-secret proxy further comprises a webserver that extracts the password embedded in the character string based upon the sequence of images.

7. The system of claim 1, wherein the shared-secret proxy further comprises a proxy that alters requests and responses communicated between the client and the login server.

8. The system of claim 1, wherein the set of user images includes L images, where L is greater than a longest password of the user.

9. The system of claim 1, wherein K random images are included in the sequence of images for every user image, where K is an integer.

10. A method that facilitates logging in a user from an untrusted client, comprising:
    identifying a user based upon an uniform resource locator (URL)I for a login server and a corresponding user identifier received from the untrusted client;
    retrieving a first set of images unique to the user and a second set of random images;
    randomly generating a sequence of images that mixes the first and second sets of images in response to a login to a login server that includes a submission of a uniform resource location (URL) and a user identifier pair that uniquely identifies the first set of images and is associated with a user account, the sequence of images prompts the user to enter an obscured sequence of characters from the untrusted client so that the first set of images corresponds to characters of a password, and the second set of random images corresponds to random characters;
    receiving the obscured sequence of characters from the untrusted client;
    sending the obscured sequence of characters and the sequence of images back to the untrusted client following a login failure; and
    receiving an updated sequence of characters from the untrusted client that includes a modification to a character of the password and a user selected change to a random character in the obscured sequence of characters, the user identifying the character of the password and the random character in the obscured sequence of characters based on the sequence of images.

11. The method of claim 10, further comprising:
    unmapping the obscured sequence of characters based upon the sequence of images to decipher the password; and
    forwarding the password to the login server.

12. The method of claim 11, further comprising:
    temporarily storing the password; and
    deleting the password after a predetermined amount of time.

13. The method of claim 10, further comprising:
    unmapping the updated sequence of inputted characters based upon the sequence of images to decipher the password; and
    reattempting to login with the password.

14. The method of claim 10, further comprising setting up a user account with a shared-secret proxy.

15. The method of claim 14, further comprising:
    initializing a user account based upon a URL of a login server and a user identifier;
    receiving the first set of images from a trusted client; and
    storing the first set of images in memory that corresponds to the user account to form a shared secret that enables deciphering of the password from the obscured sequence of characters or the updated sequence of characters.

16. A system that enables deciphering a login password from a character string including noise, the system comprising:
   a randomized selection component that randomly generates a sequence of images that includes a set of user images in which each image correlates with a corresponding character of a password and a set of random images positioned in a random order, the sequence of images prompting the user to provide an obscured character string that includes random characters and the password; and
   a decipher component that deciphers the password from the obscured character string received from a client device that includes a mixture of password characters and random characters using the set of user images that are selected by the user;
   a proxy component that returns a rogue password that is different from the deciphered password in place of the deciphered password to the client device, and that submits the deciphered password to a login server in response to receiving a request to submit the rogue password to the login server,
   wherein the proxy component further comprises a registration component that prepares a user account including a uniform resource locator (URL) and a user identifier pair that uniquely identifies the set of user images, the proxy component automatically retrieves the set of user images for integration into the sequence of images in response to an initiation of the login to the login server with a submission of the URL and the user identifier pair to the proxy component.

17. The system of claim 16, further comprising a data store that stores the at least the set of user images.

* * * * *